F. B. SCHUYLER.
BREAD TOASTER.
APPLICATION FILED JUNE 20, 1907.
944,283.
Patented Dec. 28, 1909.
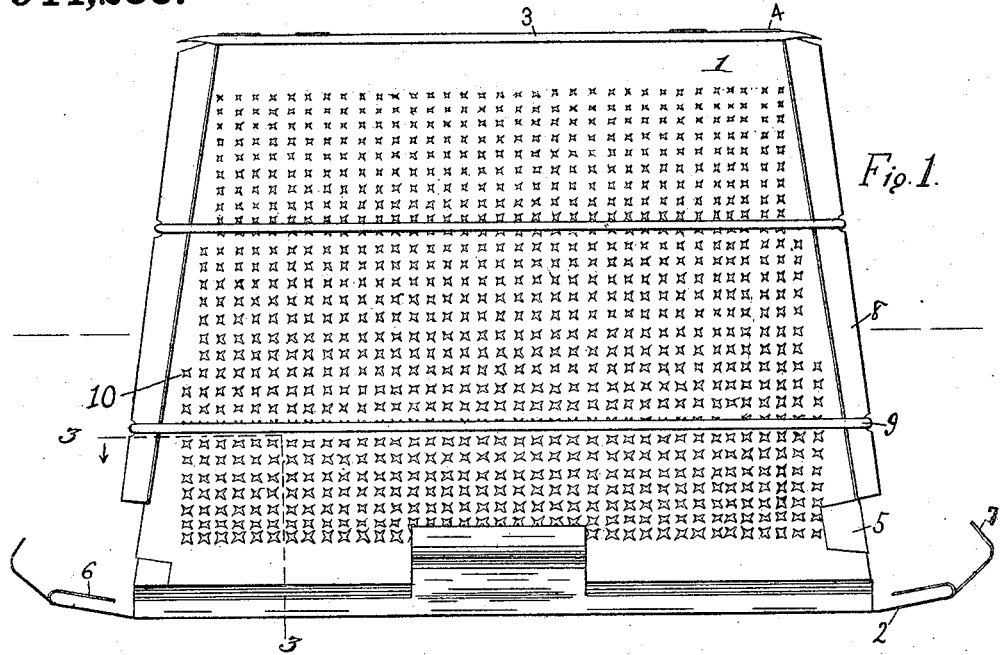
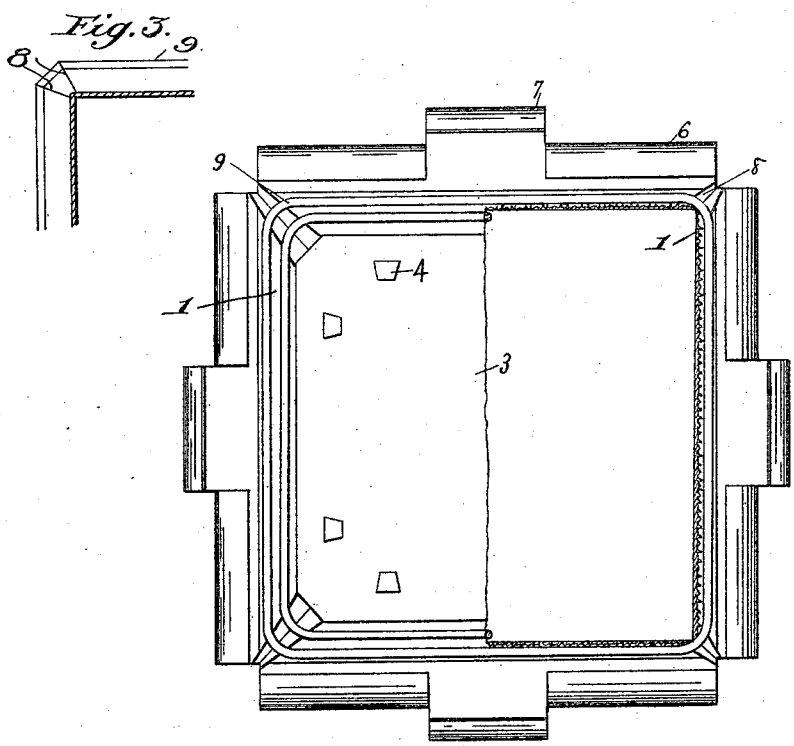
WITNESSES:
E. H. Fogerty
C. L. Howe
INVENTOR,
Frank B. Schuyler
BY
Francis M. Wright,
ATTORNEY.

UNITED STATES PATENT OFFICE.

FRANK B. SCHUYLER, OF BERKELEY, CALIFORNIA.

BREAD-TOASTER.

944,283. Specification of Letters Patent. Patented Dec. 28, 1909.

Application filed June 20, 1907. Serial No. 379,843.

*To all whom it may concern:*

Be it known that I, FRANK B. SCHUYLER, a citizen of the United States, residing at Berkeley, in the county of Alameda and State of California, have invented new and useful Improvements in Bread-Toasters, of which the following is a specification.

The object of the present invention is to provide a toaster for toasting bread on a gas stove, which will be economical in the consumption of gas, convenient in operation, cheap and simple in construction, and durable in use, and by which the bread can be toasted uniformly and without danger of burning.

Referring to the drawing, Figure 1 is a side view of my improved toaster; Fig. 2 is a broken top plan view of the same on a reduced scale; Fig. 3 is a horizontal cross section of a corner of the toaster on the line 3—3 of Fig. 1.

On referring to the drawing, it will be seen that the general form of the toaster is that of a truncated square pyramid, it being formed of four side walls 1 of sheet metal, bent out or flanged at the bottom, as shown at 2, to form a support for the slices of bread and a square top 3 connected with all of said walls by means of lugs 4 on said walls which pass through slots in the top and are then bent down, as shown. The walls are connected together at the bottom by means of lips 5 extending laterally from the edges of the walls and bent over the edges of the adjacent walls. The extended or base portion 2 of each wall is formed with three tongues, the outer two 6 of which are bent up and back on themselves inwardly or toward the main body of the wall to furnish ledges upon which to support the slice of bread to be toasted, while the middle tongue 7 extends outward and then upward to engage the rear surface of the slice of bread and retain it in place. The ledges 6 are spaced from the main portion 2 of the base to form passages thereunder, to permit the air to pass under said ledges and maintain them comparatively cool and prevent the bread being burned at the bottom in the operation of toasting. Each wall is also bent outward at its vertical edges substantially at right angles to the main body of the wall to form flanges 8, and around the edges of the eight flanges thus formed extend wires 9. These wires, in conjunction with said flanges, serve as side supports for the slices of bread while being toasted and to maintain said slices at the proper distance from the walls of the toaster. Said flanges are wider at the top than at the bottom, the object being to support the slices of bread at the greater distance from the wall at the top, on account of the heat being greater at the top, and so that, notwithstanding the greater heat, the slice of bread will be uniformly heated both at top and bottom. A further important function also of these flanges is that they serve to sufficiently retain the heat therebetween, and for this purpose also the top 3 extends beyond the walls and to the edges of the flanges.

Each of the walls is formed with a large number of perforations 10, to permit the gaseous products of combustion of the gas to escape therethrough, which gases, being highly heated, effect the toasting of the bread. These perforations progressively diminish in size from the bottom upward, in other words, the ratio of the perforated to the unperforated area is greater at the bottom than at the top, this construction also being provided because of the fact that the heat is greater at the top than at the bottom of the toaster, while it is desirable to apply a uniform heat to all parts of the bread being toasted.

From the above description it will be seen that uniformity of toasting is obtained, first, because the perforations in each wall are reduced in number and in size progressively upward, and, secondly, because the surface of the bread is maintained at a greater distance from the wall at the top than at the bottom. Economy in the consumption of gas is obtained, first, because the products of combustion are uniformly applied to the bread which is to be toasted, and, secondly, because of the flanges formed at the sides of the walls of the toaster and also the overhanging top, which sufficiently retain the heat. The danger of burning the bread in the operation of toasting is avoided, because no excessively hot gases can pass through the walls at any point thereof, because the bread is maintained at all points at a sufficient distance from each wall to prevent burning, and because the bottom of the bread is raised out of contact with the base of the toaster which becomes highly heated by conduction.

Further it will be seen that the device is very cheap and simple in construction and convenient in operation.

An important and novel feature of my invention is that it is so constructed that the toasters can be nested together, so as to occupy but little space in packing. Thus the upper portion of each toaster, about as far down as the lower wire 9, can be inserted in the interior of another toaster, and in this way a large number of toasters can be packed in a comparatively small space. This is due to the upwardly tapering form of the toaster, and also to the fact that the interior of the toaster is entirely open between the bottoms of the four walls.

I claim:—

1. A bread toaster having a heat transmitting surface formed of perforated walls of sheet metal, each wall having a vertical edge extending outward at an angle with the wall to form a flange, and an outwardly extending base, a top connected with said walls, and a horizontal wire surrounding and engaging all of said flanges, substantially as described.

2. A bread toaster having perforated metallic walls, each having an outwardly extending base, and a vertical edge extending outward at an angle with the wall to form a flange wider at the top than at the bottom, a top connected with said walls, and a horizontal wire extending between the outer edges of the flanges in front of each of said walls, substantially as described.

3. A bread toaster having perforated walls of sheet metal, each having a base extending outwardly from said walls, the outer portion of said base extending upward and then back on itself toward the wall to provide an air cooled support for the bread, and a top connected with said walls, substantially as described.

4. A bread toaster having perforated walls of sheet metal, each having a vertical edge extending outward at an angle with the wall to form a flange, and a base extending outwardly from said wall, the outer portion of said base extending upward and then back on itself toward the wall to provide an air cooled support for the bread, a top connected with said walls, and a horizontal wire extending between the outer edges of the flanges in front of each of said walls, substantially as described.

5. A bread toaster having perforated walls of sheet metal, each having a base extending outwardly from the wall, a portion of which base extends upward and then back on itself to provide an air cooled support for the bread, and another portion of which extends outward and then upward to form a retainer for the bread, and a top connected to said walls, substantially as described.

6. A bread toaster having perforated walls of sheet metal, each wall having a vertical edge extending outward at an angle with the wall to form a flange, each wall also having a base extending outwardly, a portion of which extends upward and then inward or back on itself to provide an air cooled support for the bread, and a portion of which extends outward and then upward to form a retainer for the bread, a top connected with said walls, and a horizontal wire surrounding and engaging all of said flanges, substantially as described.

7. A bread toaster having perforated walls of sheet metal, each having a vertical edge extending outward at an angle to form a flange, and a base also extending outwardly, a top connected with said walls and extending outward past the upper portions of the walls, and a horizontal wire extending over the outer edges of the flanges in front of each of said walls, substantially as described.

8. A bread toaster, having perforated walls of sheet metal, each having a vertical edge extending outward at an angle with the wall to form a flange, and having also an outwardly extending base, a top connected with said walls and extending outward as far as the outer edges of the flanges, and a horizontal wire surrounding and engaging all of said flanges, substantially as described.

9. A bread toaster having perforated walls of sheet metal, each having an outwardly extending side flange, and an outwardly extending base, an overhanging top connected with said walls, and a horizontal wire extending over the outer edges of the flanges in front of each of said walls, substantially as described.

10. A bread toaster having perforated metallic walls, the ratio of the perforated to the unperforated area being greater at the bottom than at the top, and a top connected with said walls, substantially as described.

In testimony whereof I have hereunto set my hand in the presence of two subscribing witnesses.

FRANK B. SCHUYLER.

Witnesses:
FRANCIS M. WRIGHT,
E. H. FOGERTY.